United States Patent
Koontz et al.

(10) Patent No.: US 7,203,398 B2
(45) Date of Patent: Apr. 10, 2007

(54) COMPACT DMD-BASED OPTICAL MODULE

(75) Inventors: Elisabeth Marley Koontz, Richardson, TX (US); Donald A. Powell, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/393,420

(22) Filed: Mar. 20, 2003

(65) Prior Publication Data

US 2004/0184717 A1 Sep. 23, 2004

(51) Int. Cl.
*G02B 6/34* (2006.01)
*G02B 6/26* (2006.01)
*G02B 6/42* (2006.01)

(52) U.S. Cl. .............. 385/37; 385/15; 385/16; 385/18; 385/31; 385/33; 385/39; 385/47; 385/49; 385/50; 385/88; 385/89; 385/92

(58) Field of Classification Search ......... 385/14–24, 385/31, 37, 47, 33, 50; 398/43, 45, 49–50, 398/82–88; 359/196–198, 208–210, 223, 359/871–872
See application file for complete search history.

(56) References Cited

U.S. PATENT DOCUMENTS

| | | | | |
|---|---|---|---|---|
| 5,071,232 A | * | 12/1991 | Kato et al. | 359/315 |
| 5,155,778 A | * | 10/1992 | Magel et al. | 385/18 |
| 5,345,521 A | * | 9/1994 | McDonald et al. | 385/19 |
| 5,414,819 A | * | 5/1995 | Redmond et al. | 385/17 |
| 5,440,654 A | * | 8/1995 | Lambert, Jr. | 385/17 |
| 5,488,681 A | * | 1/1996 | Deacon et al. | 385/37 |
| 5,774,604 A | * | 6/1998 | McDonald | 385/18 |
| 5,808,780 A | * | 9/1998 | McDonald | 359/290 |
| 5,835,458 A | * | 11/1998 | Bischel et al. | 369/44.12 |
| 5,960,132 A | * | 9/1999 | Lin | 385/18 |
| 5,960,133 A | * | 9/1999 | Tomlinson | 385/18 |
| 5,973,844 A | * | 10/1999 | Burger | 359/622 |

(Continued)

OTHER PUBLICATIONS

High Perfromance Analog Solutions in Optical Networking; Optical Networking Segment Sales & Marketing; Texas Instruments; Dallas, Texas.

(Continued)

*Primary Examiner*—Frank G. Font
*Assistant Examiner*—Ryan Lepisto
(74) *Attorney, Agent, or Firm*—Charles A. Brill; Wade James Brady, III; Frederick J. Telecky, Jr.

(57) ABSTRACT

An optical module having an integral optical waveguide with waveguide ports at each end. The optical waveguide receives an input light beam through a first waveguide port. The input light beam passes through the waveguide and is emitted from the second waveguide port, where it is reflected by the reflective surface. After being reflected by the reflective surface, the input light beam can be directed onto the surface of a DMD array, where the input light beam can be selectively reflected in a particular direction. The reflective surface may also comprise a diffractive grating, thereby enabling wavelength selective switching. In addition, the reflective surface may comprise a generally concave surface that converts a diverging input light beam into a generally collimated light beam, thereby facilitating more accurate selection and switching by the DMD array.

18 Claims, 4 Drawing Sheets

U.S. PATENT DOCUMENTS

| | | | | |
|---|---|---|---|---|
| 6,021,947 | A * | 2/2000 | Swartz | 235/472.01 |
| 6,097,859 | A * | 8/2000 | Solgaard et al. | 385/17 |
| 6,108,355 | A * | 8/2000 | Zorabedian | 372/20 |
| 6,204,946 | B1 * | 3/2001 | Aksyuk et al. | 398/9 |
| 6,212,309 | B1 * | 4/2001 | Nguyen et al. | 385/17 |
| 6,263,127 | B1 * | 7/2001 | Dragone et al. | 385/24 |
| 6,278,812 | B1 * | 8/2001 | Lin et al. | 385/18 |
| 6,295,154 | B1 * | 9/2001 | Laor et al. | 359/223 |
| 6,347,167 | B1 * | 2/2002 | Hagelin | 385/18 |
| 6,374,007 | B1 * | 4/2002 | Hagelin et al. | 385/17 |
| 6,396,973 | B1 * | 5/2002 | Hagelin et al. | 385/17 |
| 6,398,389 | B1 | 6/2002 | Bohler et al. | |
| 6,430,331 | B1 * | 8/2002 | Hagelin et al. | 385/17 |
| 6,445,841 | B1 * | 9/2002 | Gloeckner et al. | 385/17 |
| 6,456,761 | B2 * | 9/2002 | Yap et al. | 385/33 |
| 6,483,957 | B1 * | 11/2002 | Hamerly et al. | 385/11 |
| 6,483,969 | B1 * | 11/2002 | Yap et al. | 385/52 |
| 6,507,685 | B1 * | 1/2003 | Polynkin et al. | 385/37 |
| 6,532,115 | B2 * | 3/2003 | Holmes | 359/722 |
| 6,757,113 | B1 * | 6/2004 | Basavanhally et al. | 359/819 |
| 6,760,503 | B1 * | 7/2004 | Hermann | 385/17 |
| 6,765,724 | B1 * | 7/2004 | Kramer | 359/566 |
| 6,795,602 | B2 * | 9/2004 | Neukermans et al. | 385/18 |
| 6,842,556 | B2 * | 1/2005 | Reznichenko | 385/18 |
| 6,882,766 | B1 * | 4/2005 | Corbalis et al. | 385/16 |
| 2002/0067888 | A1 * | 6/2002 | Morozov et al. | 385/37 |
| 2002/0071627 | A1 * | 6/2002 | Smith et al. | 385/15 |
| 2002/0081070 | A1 * | 6/2002 | Tew | 385/39 |
| 2002/0131698 | A1 * | 9/2002 | Wilde | 385/31 |
| 2002/0164114 | A1 * | 11/2002 | Golub et al. | 385/18 |
| 2002/0176151 | A1 * | 11/2002 | Moon et al. | 359/298 |
| 2004/0047632 | A1 * | 3/2004 | Powell | 398/83 |
| 2004/0086218 | A1 * | 5/2004 | Liu et al. | 385/18 |
| 2004/0120049 | A1 * | 6/2004 | Bartlett et al. | 359/627 |

OTHER PUBLICATIONS

Digital Signal Processing Solutions in Optical Networking; Optical Networking Segment Sales & Marketing; Texas Instruments; Dallas, Texas.

Yoder et al.; DLP™ Technology: Applications in Optical Networking; DLP™ Products Optical Networking; Texas Instruments, Inc.; Plano, Texas.

* cited by examiner

COMPACT DMD-BASED OPTICAL MODULE

BACKGROUND

Micromechanical devices are small structures typically fabricated on a semiconductor wafer using techniques such as optical lithography, metal sputtering, oxide deposition, and etching that have been developed for the fabrication of integrated circuits. Digital micromirror devices (DMDs), sometimes referred to as deformable mirror devices, are a type of micromechanical device. Digital micromirror devices can be used in a variety of applications such as optical display systems or optical switching systems.

DMD arrays have many advantages when used in optical switching systems. Specifically, a DMD array has the ability to selectively reflect portions of a light beam that is directed onto its surface. This feature can be used to implement a variety of functions such as signal monitoring, or wavelength-based switching. U.S. Pat. No. 6,295,154 entitled "Optical Switching Apparatus," which is hereby incorporated by reference, describes the use of DMD arrays for these kinds of optical switching applications. The present application describes the use of lenses, polarizers, mirrors, and other such components to interface a free-space-operating DMD array with a waveguide-based optical system. One example of a set of optical interface equipment employed in a DMD array is disclosed in U.S. Pat. No. 6,398,389 entitled "Solid State Light Source Augmentation for SLM Display Systems," which is also hereby incorporated by reference.

There are several difficulties that may be associated with the use of lenses, polarizers, mirrors and other such components in a free-space optical system. First, the optical components are often physically and manually aligned for optimal performance. Second, the operation of a free-space optical system employing such components can be affected by movement, vibration, or mechanical stress. Third, free-space optical systems may be relatively large in size compared to other types of optical systems. Fourth, given their relatively large size, free-space optical systems may be especially susceptible to thermal stresses; in particular, if one portion of the system is heated to a greater extent than the rest of the system, this can affect the alignment and performance of the entire system.

BRIEF SUMMARY

Disclosed herein is an improved optical interface system for a DMD array. The embodiments described herein provide for an improved optical interface system that is less sensitive to movement, vibration or mechanical stresses. The described embodiments further provide an optical interface system that occupies less space than conventional free-space optical interface systems. Also described herein is an optical interface system that can add optical functionality such as wavelength demultiplexing in close proximity to a DMD array in a compact footprint as a replacement to discrete free-space optical components. The above features are described in certain embodiments as incorporating all of the components of an optical interface system into a single, integral component.

One embodiment of the disclosed invention comprises an optical beam module that has an integral optical waveguide with waveguide ports at each end. The optical beam module also comprises a reflecting surface that is adapted to reflect light emitted from one of the waveguide ports. At one end, the optical waveguide receives an input light beam through a first waveguide port. The input light beam passes through the waveguide and is emitted from the second waveguide port, where it is reflected by the reflective surface. The reflective surface can be integral to the optical beam module, or it can be mounted onto the module. After being reflected by the reflective surface, the input light beam is directed onto the surface of a DMD array, where some or all of the input light beam can be selectively reflected in a particular direction. The reflective surface may also comprise a diffractive grating, which reflects the various wavelengths of the input light beam at varying angles, thereby enabling wavelength selective switching. In addition, the reflective surface may comprise a generally concave surface that converts a diverging input light beam into a generally collimated light beam, thereby facilitating more accurate selection and switching by the DMD array. According to one embodiment, the optical beam module has a small profile and may be directly attached to a DMD array. Other embodiments are contemplated, however, in which a DMD array is mounted to the optical beam module at a predetermined distance and angle.

Other embodiments of the invention are contemplated in which the optical beam module comprises more than one integral waveguide. For example, the optical beam module may comprise two integral waveguides corresponding to an input light beam and an output light beam, respectively. The reflective surface may comprise two corresponding reflective portions that reflect light beams to and from the first and second waveguides, respectively. According to this embodiment, a DMD array can be used to select portions of the input light beam to be directed to the output waveguide. Another embodiment of the optical module utilizes four integral waveguides corresponding to an input port, an add port, a drop port, and an express port. Four reflective portions are utilized in this embodiment, each of which corresponds to a particular waveguide. By utilizing four waveguides and four reflective portions, optical networking operations can be performed such as adding and dropping particular wavelengths from a multiplexed light beam.

Figure 1:
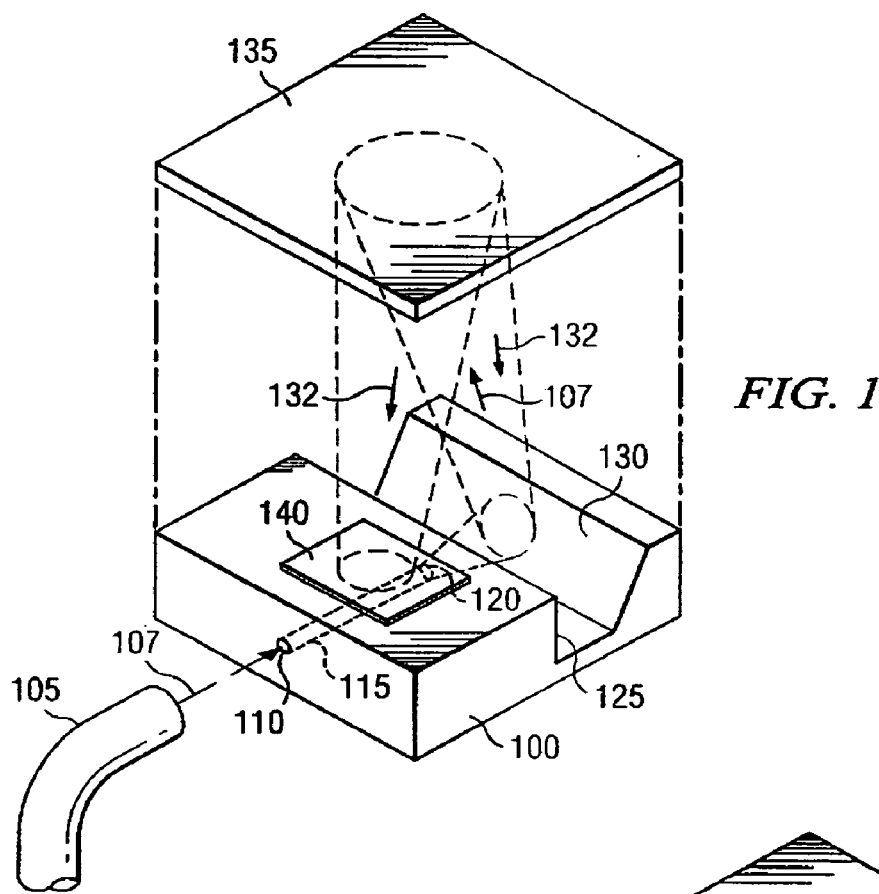
FIG. 1 is a perspective view of one embodiment of an optical system having an optical beam module interfacing with a single input/output waveguide.

All of these drawings are drawings of certain embodiments. The scope of the claims is not to be limited to the specific embodiments illustrated in the drawing and described below.

DETAILED DESCRIPTION

One embodiment of an improved optical interface system is depicted in FIG. 1. In FIG. 1, an optical module 100 is depicted as comprising a unitary piece that includes a waveguide 115 that passes from a first waveguide port 110 to a second waveguide port 120, which is located on an inside face 125 of the module 100. The optical module 100 may comprise a variety of materials, including Silicon (Si), Silicon Dioxide ($SiO_2$), III–V semiconductor materials (e.g., InP, GaAs, AlGaAs, or some other combination of one or more Group III elements with one or more Group V elements), and II-VI semiconductor materials (e.g., ZnSe, ZnMgSSe, or some other of one or more Group II elements with one or more Group VI elements). The optical module 100 also comprises a reflective surface 130 that can reflect light emitted from the second waveguide port 120 onto a DMD array 135. The reflective surface 130 may comprise a variety of surfaces and substances that reflect light, including, for example, a reflective metal such as aluminum; or a reflective grating. Also depicted in FIG. 1 is an optional optical dump 140 that can be used to terminate an optical beam. According to another embodiment, an optical sensor can be placed in the location of the optical dump 140. In this arrangement, a portion of the light reflected by the DMD array 135 can be reflected onto the optical sensor so that the input light signal 107 can be monitored. The reflective surface 130 may also contain convex or concave features to focus or shape the reflected optical signal onto the surface of the DMD array 135. Alternatively, the reflective surface 130 may contain a series of reflective micro-lenses. Further, a micro-lens element can be added between the optical waveguide 115 and DMD array 135.

The optical module 100 operates in the following manner. First, an input/output waveguide 105, such as a fiber optic cable, provides an input light beam 107 to the first waveguide port 110. The input light beam 107 passes through the optical module 100 via the optical waveguide 115 to the second waveguide port 120. The optical waveguide 115 can do more than pass an optical signal through; it can include functions such as multiplexing/demultiplexing using an arrayed waveguide grating, or switching using, for example, a Mach-Zehnder configuration. In the illustrated embodiment of FIG. 1, the input beam 107 diverges as it passes out of the second waveguide port 120. This divergence is useful because it allows the input beam 107 to be directed to impinge upon multiple DMD pixels of the DMD array 135, thereby allowing for higher resolution control of the light beam 107. To prevent the light beam 107 from continuously diverging, a curved surface, such as a concave reflector, can be used as the reflecting surface 130. The input light beam 107 is reflected by the reflecting surface 130 onto the surface of a DMD array 135, which is comprised of hundreds, thousands, or millions of micromirrors. The DMD array 135 can be directly mounted onto the optical module 100 or placed at a distance from the module 100, depending upon design considerations. The multiple micromirrors comprising the surface of the DMD array 135 generally form a planar surface. By controlling the position of the micromirrors in the DMD array 135, the direction of the beam of light reflected by the surface of the DMD array 135 (i.e. the output light beam 132) can be controlled. Some portions or all of the input light beam 107 can be directed by the DMD array 135 into an optical dump 140 so that those portions or all of the light beam is terminated there. Similarly, some or all of the input light beam 107 can be monitored by an optical sensor which may be located in place of the optical dump 140 illustrated in FIG. 1.

According to one embodiment, it is desirable to reflect the input light beam 107 directly back in the direction of the reflective surface 130. This creates an output light beam 132. After being reflected by the surface of the DMD array 135, the output light beam 132 is directed onto the reflecting surface 130, where it is reflected back into the waveguide 115 through the second waveguide port 120. As stated earlier, the reflective surface 130 may comprise a concave shape so that the output light beam 132 converges at the interface of the waveguide 115. Because the waveguide 115 is bi-directional, it can transmit input and output light beams at the same time. The output light beam 132 then passes through the waveguide 115 back into the input/output waveguide 105.

The input/output waveguide 105 provides an input light beam 107 and receives an output light beam 132 that are horizontal relative to the figure. It should also be noted that the DMD array 135 can also be positioned horizontally such that the entire optical system is more compact than a conventional free-space optical switching apparatus. Furthermore, the optical module 100 depicted in FIG. 1 is less sensitive to vibration and mechanical stress because it is comprised of a small, unitary optical module 100. Moreover, the optical module 100 is less sensitive to misalignment due to thermal stress because all of the components of the optical module are likely to be subjected to similar thermal loads.

Figure 2:
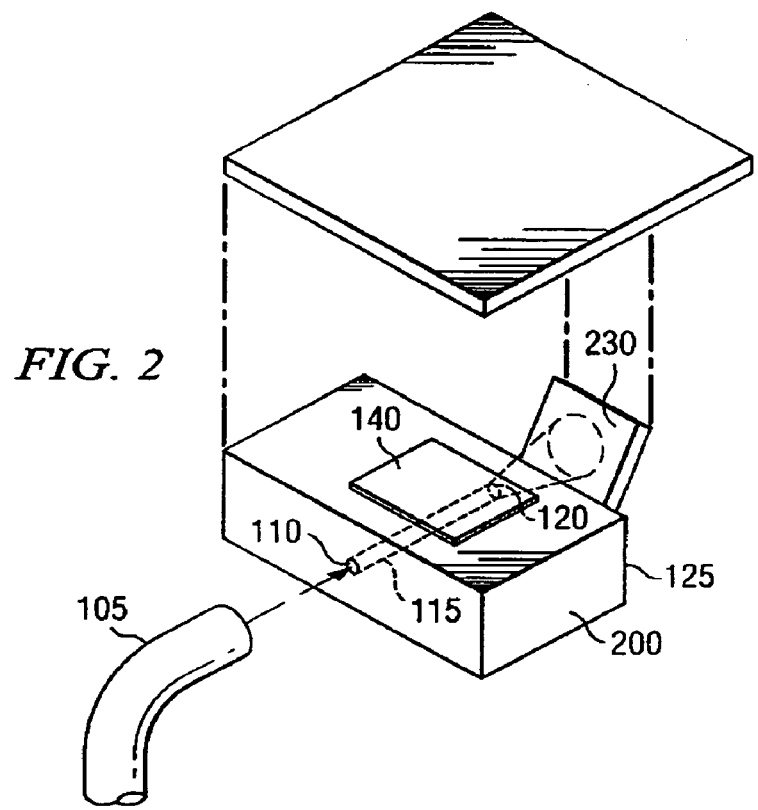
FIG. 2 is a perspective view of another embodiment of an optical system having an optical beam module interfacing with a single input/output waveguide.

Another embodiment of the optical module 200 is depicted in FIG. 2. Like the module depicted in FIG. 1, the optical module 200 of FIG. 2 includes a first waveguide port 110, a waveguide 115, a second waveguide port 120, an inside face 125, and an optional optical absorber 140. However, the optical module 200 of FIG. 2 does not include a reflective surface that is integral to the module 200, but instead includes a reflective surface 230 that is independent of the module 200. The reflective surface 230 may be rigidly attached to the optical module 200, or the reflective surface 230 and optical module may be fixed relative to each other but not directly attached. Much like the embodiment described previously, the reflective surface 230 may comprise a variety of optically reflective substances, such as aluminum, or an optically reflective grating.

Figure 3:
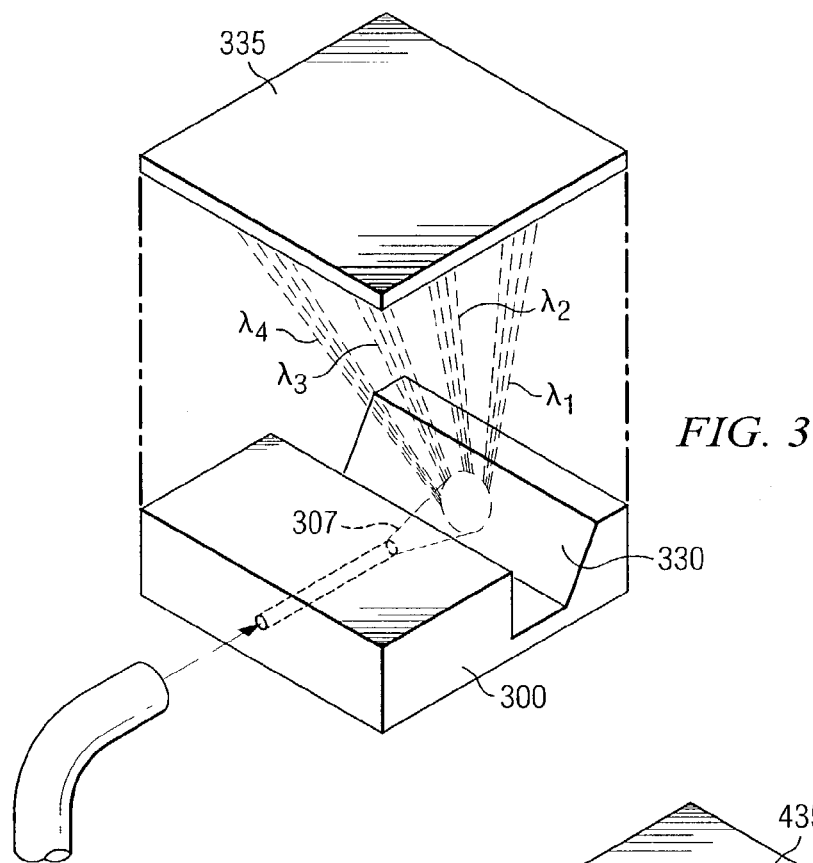
FIG. 3 is a perspective view of an embodiment of an optical system having an optical beam module in which a reflective surface of the module further comprises a diffractive grating.

Yet another embodiment of the optical module 300 is depicted in FIG. 3. In FIG. 3, the reflective surface 330 comprises a diffractive surface capable of reflecting various wavelengths of the light beam at varying angles. Accordingly, when an input light beam 307 is reflected/diffracted by the reflective surface 330, each wavelength component of the input light beam will be reflected at a different angle. This is illustrated in FIG. 3 by the four beams ($\lambda_1, \lambda_2, \lambda_3,$ and $\lambda_4$), which correspond to four different wavelength components of the input light beam 307. In this example, each of these wavelengths may be selectively added or removed from the output light signal by turning on or off certain groups of micromirrors in the DMD array 335. In this manner, selective wavelength switching operations can be performed by a DMD array 335.

Figure 4:
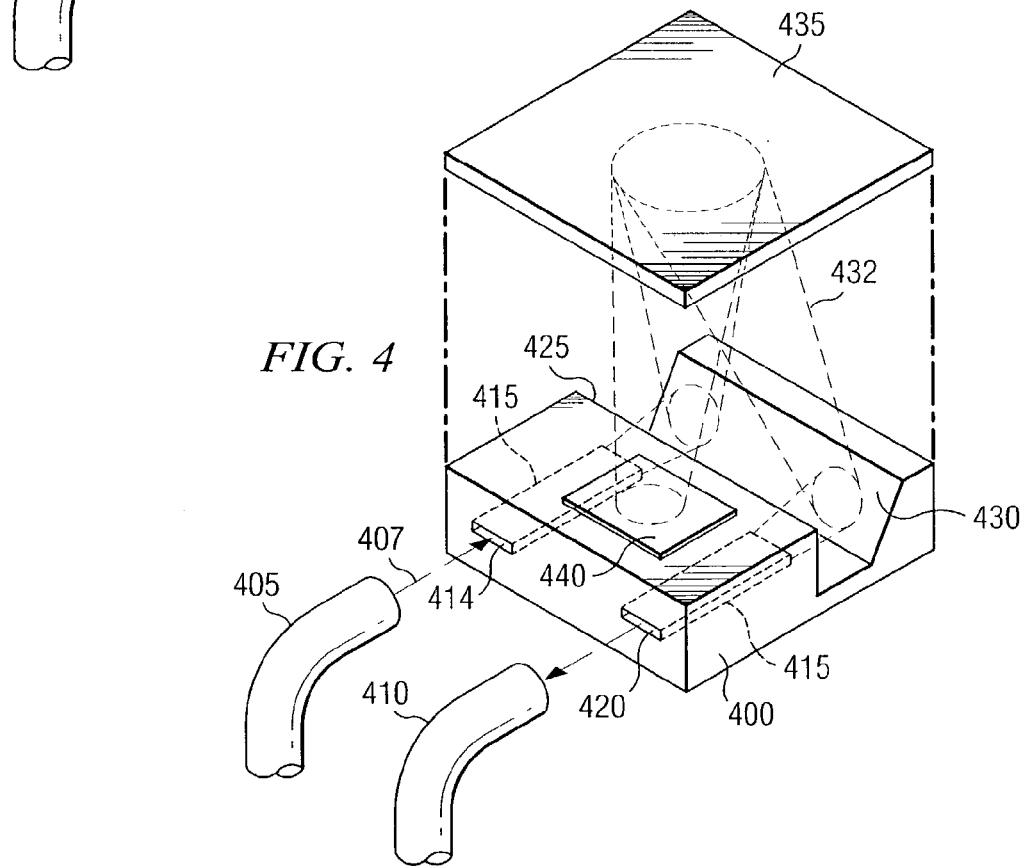
FIG. 4 is a perspective view of an alternative embodiment of an optical beam module suitable for use with the described invention in which two integral waveguides are utilized.

A further alternative embodiment of an optical module is depicted in FIG. 4. In FIG. 4, an optical module 400 is connected to an input waveguide 405 and to an output waveguide 410, both or either of which can comprise a fiber optic cable. The input waveguide 405 and the output waveguide 410 are connected to an input port 414 and an output port 420, respectively. The input port 414 and the output port 420 are connected to optical waveguides 415 that pass through the optical module 400 and terminate at an inside face 425 of the optical module 400. The optical waveguides within the optical module 400 may be comprised of a variety of waveguide substances including, for example, semiconductor waveguide materials or optical waveguide materials such as Silicon, Silicon Dioxide ($SiO_2$), Germanium, and Germanium Dioxide ($GeO_2$). The input waveguide 405 provides an input signal 407 to the input port 414 of the optical module 400. After exiting the optical waveguide, the diverging input beam 407 is directed onto a reflective surface 430, which directs the input signal 407 onto the surface of the DMD array 435. As described earlier, the micromirrors on the surface of the DMD array 435 may be selectively turned on or off, thereby controlling the direction that the output beam 407 will be reflected. According to one embodiment, the input beam 407 may be reflected back towards the reflective surface 430, thereby forming an output beam 432. According to another embodiment, the DMD array 435 may reflect the input beam 407 towards an optical dump 440, thereby terminating the input signal 407. Much like the previously described embodiments, an optical sensor can also be mounted onto the optical module 400 to monitor the input beam 407. Alternatively, the output signal 432 can be reflected back onto the reflective surface 430 by the DMD array 435. The output signal 432 is then reflected back towards the inside face 425 of the optical module 400. In the embodiment depicted in FIG. 4, the output signal 432 is reflected back to a location on an inside face 425 where the optical waveguide 415 transfers the output beam to the output port 420. Upon arriving at the output port 420, the output signal is provided to the output waveguide 410 where it may be transmitted to a desired location.

Figures 5, 6, 7:
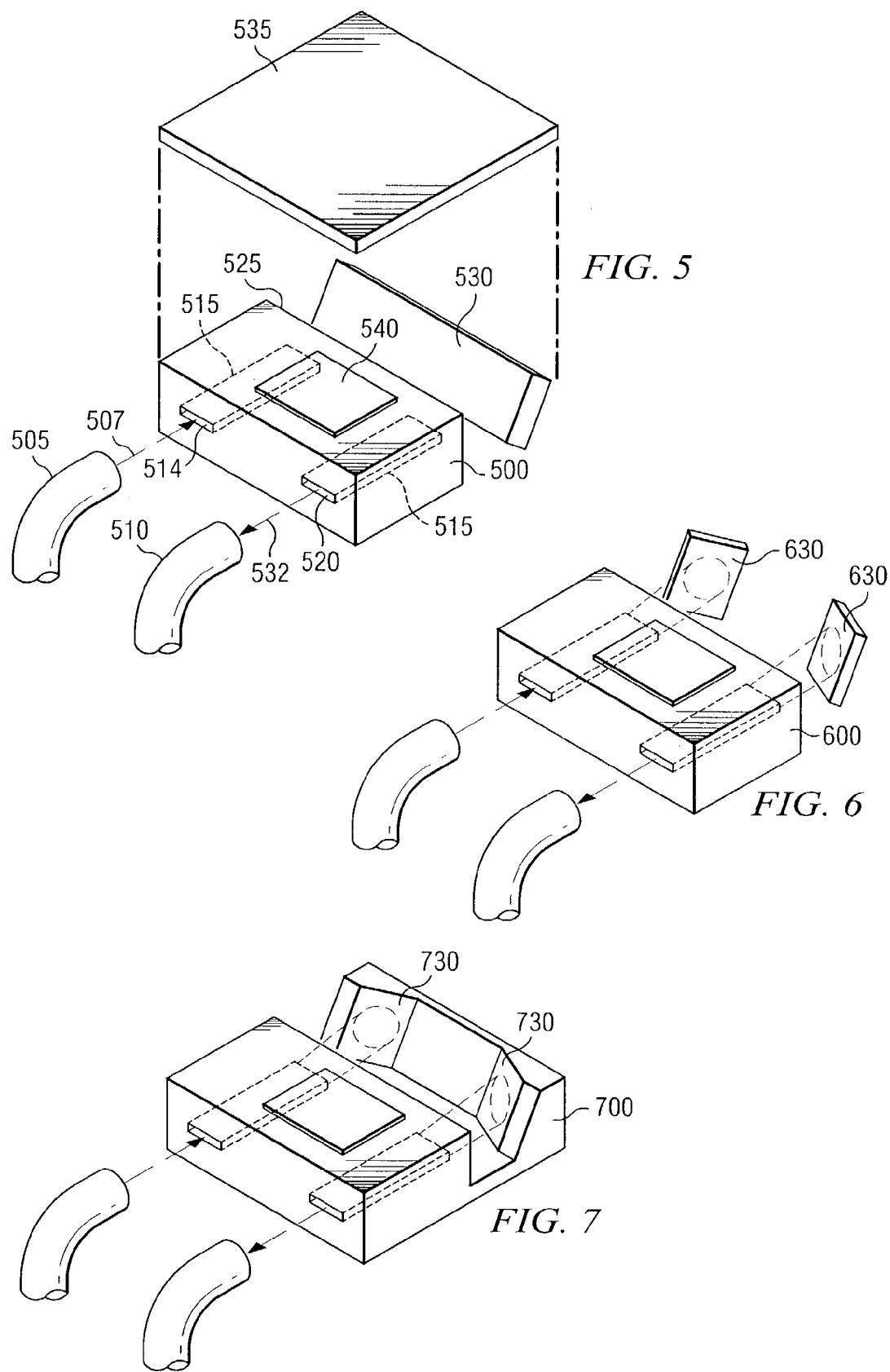
FIG. 5 is a perspective view of an embodiment of an optical system having an optical beam module in which a reflective surface is provided which is not integral to the optical beam module.
FIG. 6 is a perspective view of another embodiment of an optical system in which two reflective surfaces are provided which are not integral to the optical beam module.
FIG. 7 is a perspective view of an alternative embodiment of an optical system having an optical beam module suitable for use with the described invention in which two integral reflective surfaces are utilized.

Yet another embodiment is depicted in FIG. 5. Much like the embodiment depicted in FIG. 4, the optical module 500 depicted in FIG. 5 incorporates an input port 514, an output port 520, two optical waveguides 515 pass through the optical module 500, and an inside face 525. However, the optical module 500 incorporates a reflective surface 530 that is not integral to the module 500. Instead, the reflective surface 530 can be attached directly to the DMD array 535 or to a rigid mount (not shown). The reflective surface 530 may be comprised of a variety of reflective substances, such as reflective aluminum or a reflective grating surface. The optical module 500 may also comprise an optical dump 540 onto which an input signal 507 may be directed to terminate the signal. The optical module 500 and the reflective surface 530 depicted in FIG. 5 will operate in the same way as the optical module 400 depicted in FIG. 4. Specifically, an input signal 507 provided by an input waveguide 505 will pass through an optical waveguide 515 within the optical module 500. After exiting the optical module 500, the input signal is reflected by the reflective surface 530 onto the DMD array 535 where it may be either reflected back onto the reflective surface 530 or onto the optical dump 540. If the input signal is reflected back onto the reflective surface 530 then it will form an output signal 532 that passes through the optical waveguide 515 in the optical module 500 and into the output waveguide 510 from the output port 520.

Another embodiment is depicted in FIG. 6. The embodiment depicted in FIG. 6 is distinguished from the embodiment depicted in FIG. 5 because it incorporates two angled reflectors 630 rather than a single reflective surface 530. Because the angled reflectors 630 are independent of each other, they may be used to reflect the light in a customized direction. Otherwise, the operations of the optical module 600 depicted in FIG. 6 are very similar to the operations of the embodiment depicted in FIG. 5.

A further embodiment of the invention is depicted in FIG. 7. The optical module 700 depicted in FIG. 7 is a unitary device that incorporates angled reflective surfaces 730 rather than a single reflective surface as depicted in FIG. 4. Much like the embodiment depicted in FIG. 6, the light reflected from reflective surfaces 730 may be reflected in a customized direction based upon the specific needs and requirements of the optical device 700.

As described previously, the reflective surfaces and reflectors (430, 530, 630 and 730) may be replaced with a diffractive grating that can separate or recombine a light beam into its constituent wavelength components. In this manner, different regions of the DMD array may be illuminated with a specific wavelength component of the input signal. By doing this, certain wavelength components of the input signal may be selectively added to or removed from the output signal.

Figure 8A:
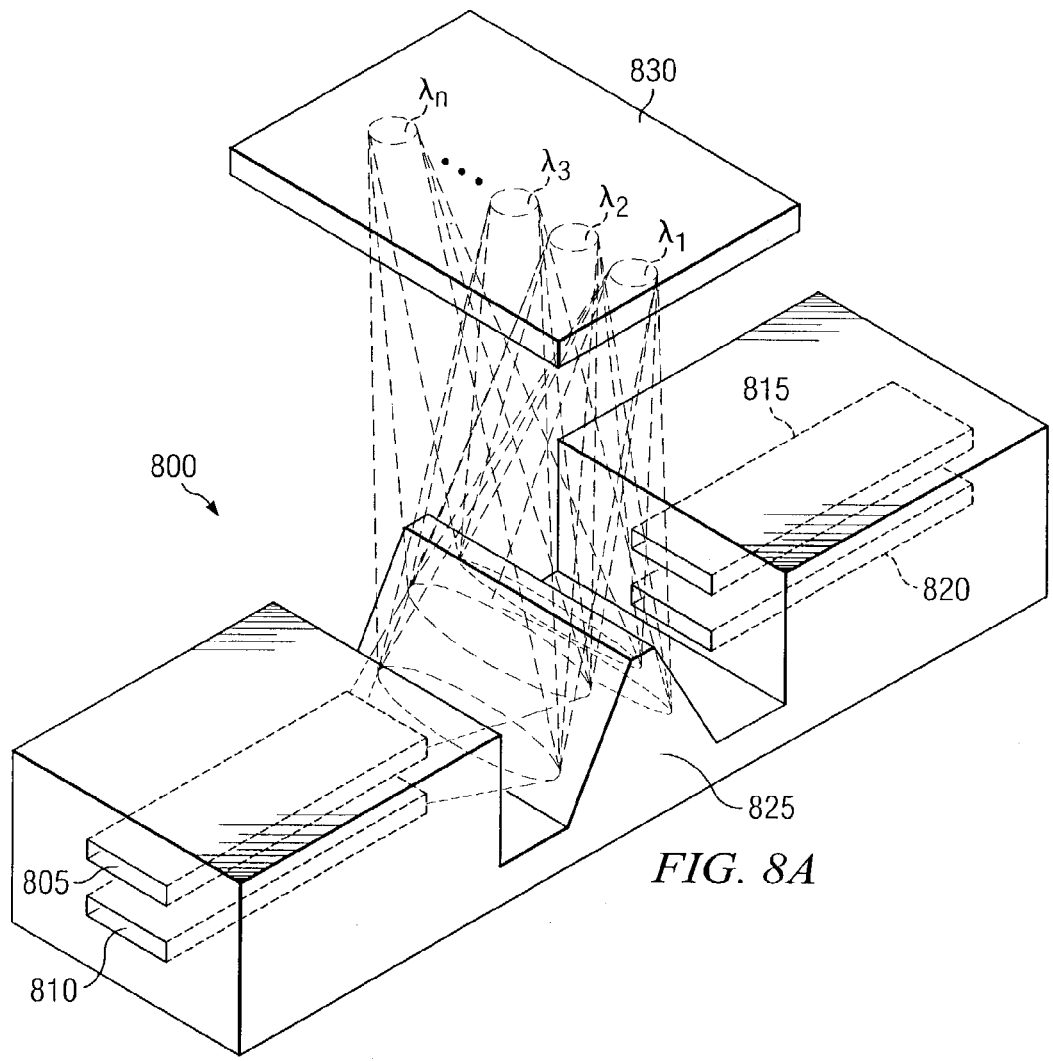
FIG. 8 is a perspective view of an alternative embodiment of an optical beam module suitable for use with the described invention in which four waveguides and two reflective surfaces are utilized.
Figure 8B:
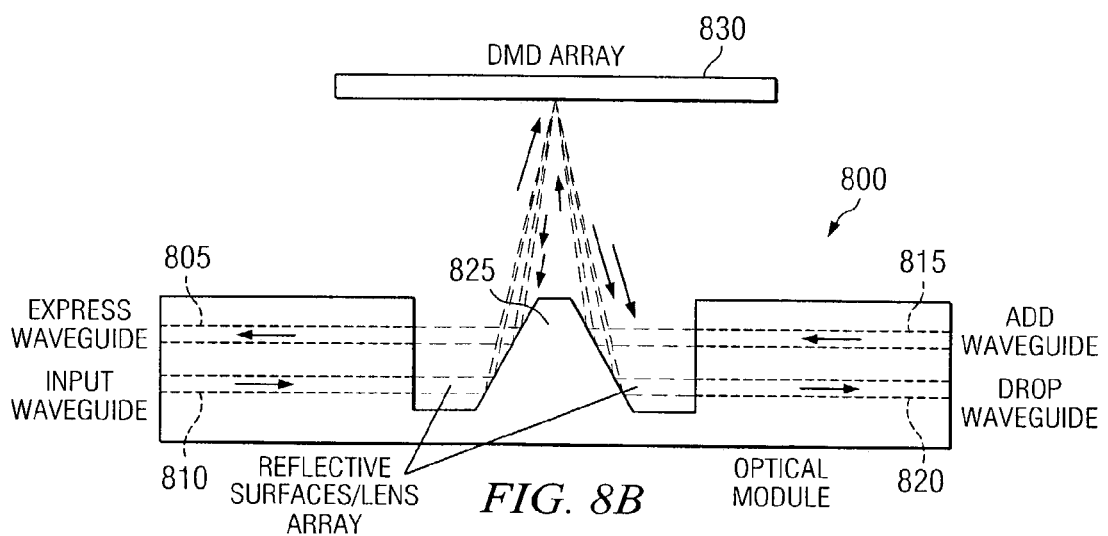

Another embodiment of the optical module is shown in FIG. 8A. In FIG. 8A, four waveguides 805, 810, 815 & 820 are aligned and stacked vertically either through photolithographic processing or by assembly. Similarly, a reflective element 825, possibly containing a lens or lens array, is placed between two stacked waveguides to form a multi-guide optical module. The optical module 800 depicted in FIG. 8 operates as follows. An input light beam is provided to the input waveguide 810 where it is directed to the reflective surface 825. The reflective surface 825 can demultiplex the input light beam into its constituent wavelength components. The demultiplexed beam may be reimaged on the surface of a DMD array 830 thereby arranging the various wavelengths in a linear pattern along the DMD, with each channel having some separation between them. This is depicted in FIG. 8 by the multiple ("N") wavelength beams ($\lambda_1, \lambda_2, \lambda_3, \ldots, \lambda_N$), such that a plurality of wavelengths may be similarly arranged along the surface of the DMD array 830. By turning the micromirrors of the DMD array 830 to one state, the light is guided to the "express waveguide" 805. If the mirrors are turned to the opposite state, the light is switched to the "drop waveguide" 820. Since each wavelength may be optically separated and arranged along the DMD array 830, individual wavelengths or any combination of wavelengths may be selectively sent to either the "drop" or "express" waveguide. For any dropped channel, it follows that a similar wavelength channel may be added from the "add waveguide" 815 and directed to the DMD array 830 which will be in the correct state to switch the particular wavelength to the "express waveguide" 805, which is then recombined in the waveguide 805 with the other channels.

Although certain embodiments and aspects of the present inventions have been illustrated in the accompanying drawings and described in the foregoing detailed description, it will be understood that the inventions are not limited to the embodiments disclosed, but are capable of numerous rearrangements, modifications and substitutions without departing from the spirit of the invention as set forth and defined by the following claims and equivalents thereof. Applicants intend that the claims shall not invoke the application of 35

U.S.C § 112, ¶ 6 unless the claim is explicitly written in means-plus-function or step-plus-function format.

We claim:

1. An optical beam module comprising:
   a base member,
   at least one optical waveguide formed in the base member and operable to transmit an input light beam;
   an inclined member formed in the base member positioned to intercept the input light beam transmitted by the optical waveguide;
   a micromirror array; and
   a reflective diffractive region receiving the input light beam from the inclined member and reflecting components of the input beam toward separate regions of the micromirror array according to the wavelength of the components.

2. An optical beam module according to claim 1, wherein the reflective region is further adapted to receive an output light beam reflected by the micromirror array and reflect the output light beam toward the at least one optical waveguide.

3. An optical beam module according to claim 1, further comprising an optical dump adapted to substantially absorb a light beam reflected by the micromirror array.

4. An optical beam module according to claim 1, wherein the reflective diffractive region is generally concave.

5. An optical beam module according to claim 1, wherein the reflective diffractive region is integral to the base member.

6. An optical beam module according to claim 1, wherein the reflective diffractive region is mounted to the base member.

7. An optical beam module adapted to be operated with a micromirror array, the optical beam module comprising:
   a base member;
   a first integral optical waveguide formed in the base member operable to transmit an input light beam;
   an inclined member formed in the base member positioned to intercept the input light beam transmitted by the integral optical waveguide;
   a micromirror array;
   a first reflective region to reflect the light intercepted by the inclined member toward the micromirror array;
   a second integral optical waveguide formed in the base member; and
   a second reflective region to reflect an output light beam received from the micromirror array to the second integral optical waveguide, wherein the first reflective region comprises a diffractive surface operable to separate the input light beam into a plurality of input light beams according to wavelength, and wherein the second reflective region comprises a diffractive surface operable to combine a plurality of output light beams.

8. The optical beam module according to claim 7 wherein the first reflective region and the second reflective region are the regions of a single reflective surface.

9. An optical beam module according to claim 7, further comprising an optical dump adapted to substantially absorb a light beam reflected by the micromirror array.

10. An optical beam module according to claim 7, wherein the first and second integral optical waveguides are disposed in a plane that is substantially parallel to the micromirror array.

11. An optical beam module according to claim 7, wherein the first and second reflective regions are generally concave.

12. An optical beam module according to claim 7, wherein the first and second reflective regions are integral to the optical beam module.

13. An optical beam module according to claim 7, wherein the first and second reflective regions are mounted to the optical beam module.

14. An optical beam module comprising:
   a base member,
   an input waveguide formed in the base member operable to transmit a first light beam;
   an add waveguide formed in the base member operable to transmit a second light beam;
   a drop waveguide formed in the base member operable to transmit a third light beam;
   an express waveguide formed in the base member operable to transmit an fourth light beam;
   a micromirror array;
   a first reflective region adapted to reflect the first light beam toward the micromirror army and adapted to reflect the fourth light beam from the micromirror array toward the express waveguide;
   wherein the first reflective region comprises a first diffractive region adapted to receive and separate the first light beam into a plurality of input light beams according to wavelength, the first diffractive region being further adapted to receive and combine a plurality of output light beams from the micromirror array into the fourth light beam;
   a second reflective region adapted to reflect the second light beam toward the micromirror array and adapted to reflect a third light beam from the micromirror array in the direction of the third waveguide; and
   wherein the second reflective region comprises a second diffractive region adapted to receive and separate the second light beam into a plurality of additive light beams according to wavelength, the second diffractive region being further adapted to receive and combine a plurality of subtractive light beams from the micromirror array into the third light beam.

15. An optical beam module according to claim 14, wherein each of the waveguides is disposed in a plane that is substantially parallel to the micromirror array.

16. An optical beam module according to claim 14 wherein the first reflective region and the second reflective region are the same reflective surface.

17. An optical beam module according to claim 16, wherein the reflective region is generally concave.

18. An optical beam module according to claim 16, wherein the reflective region is integral to the optical beam module.

* * * * *